Sept. 12, 1950 C. R. BILLINGTON 2,522,159
CONTROL FOR COMBINED AILERONS AND FLAPS
Filed Oct. 14, 1946 2 Sheets-Sheet 1
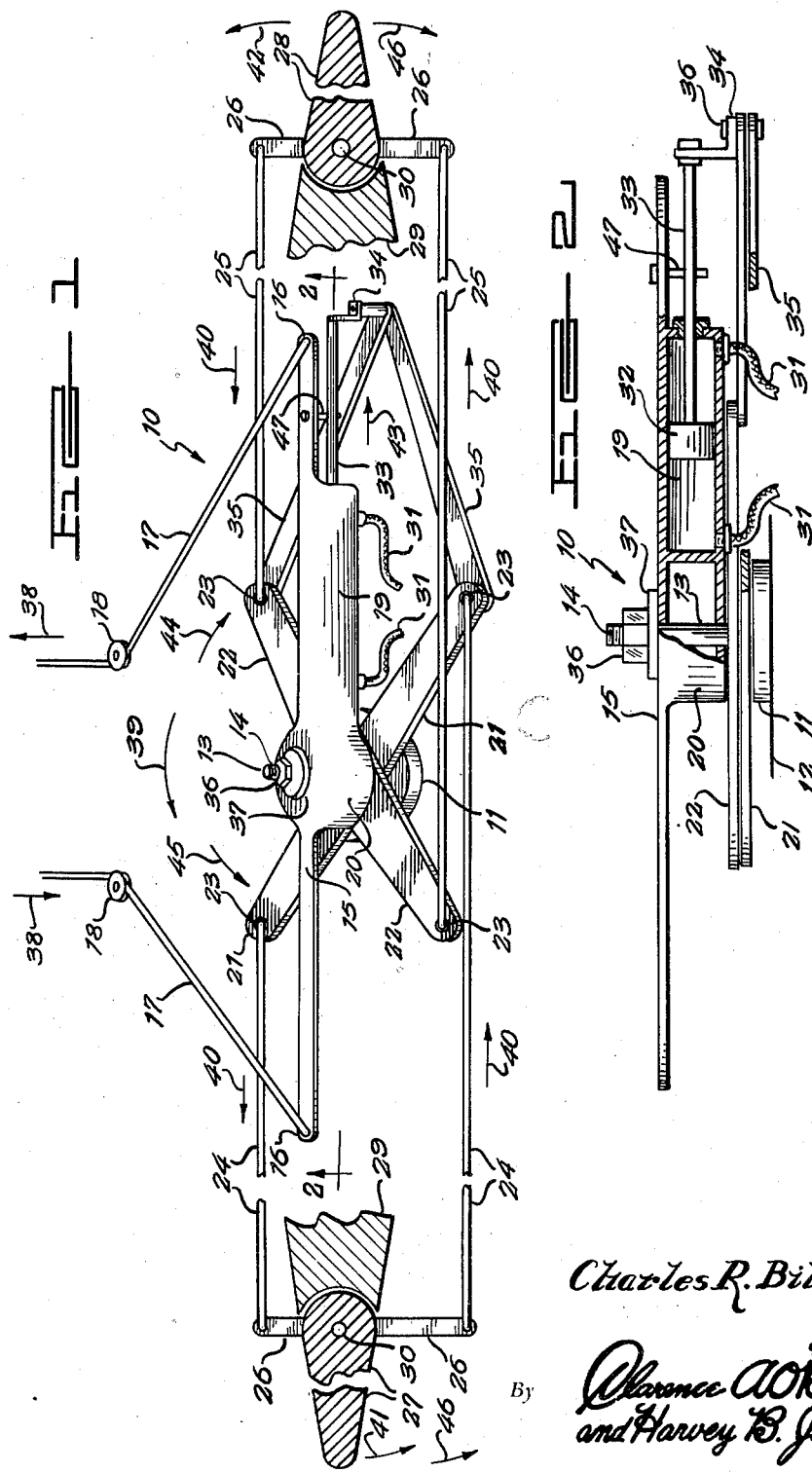
Inventor
Charles R. Billington
By Clarence A. O'Brien
and Harvey B. Jacobson
Attorneys

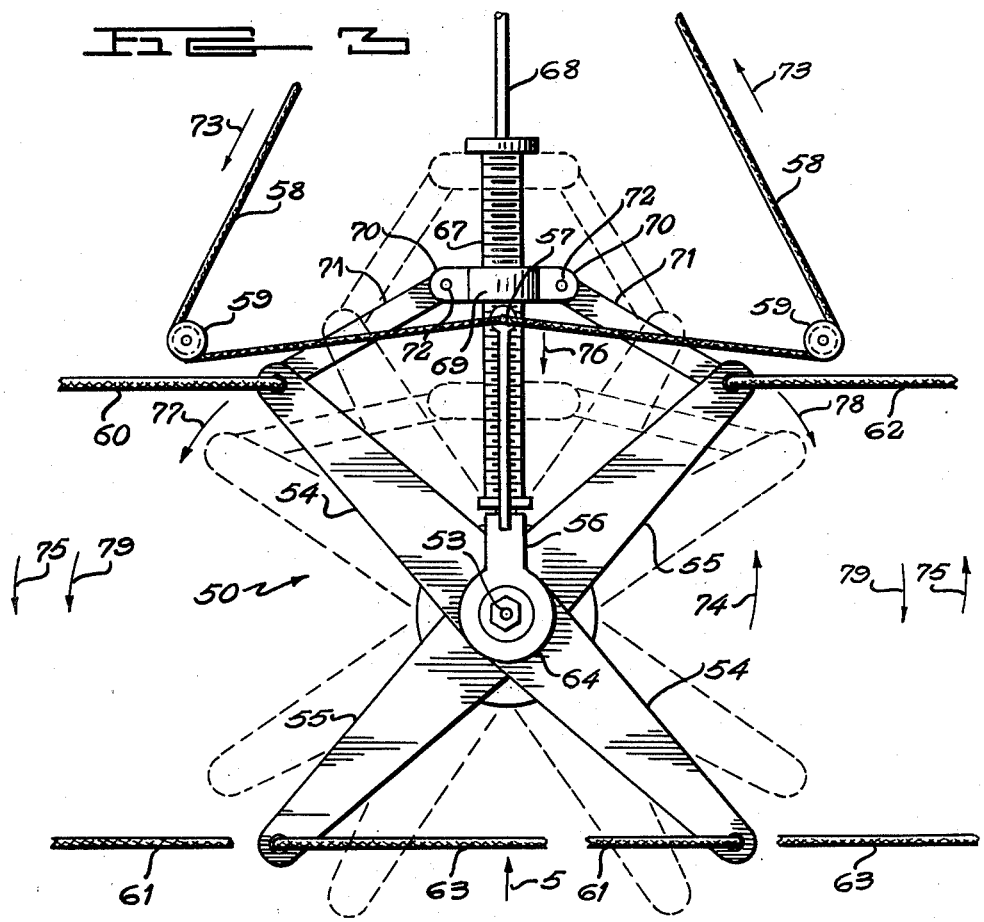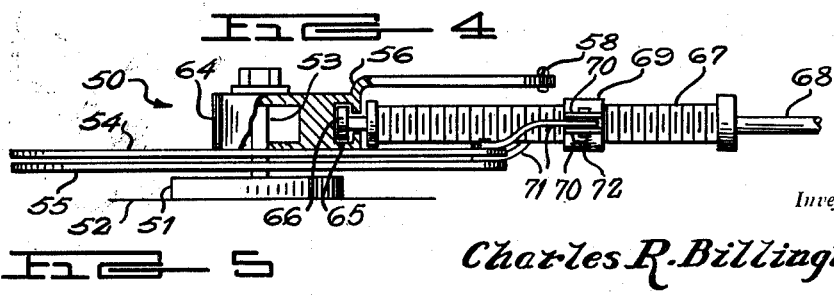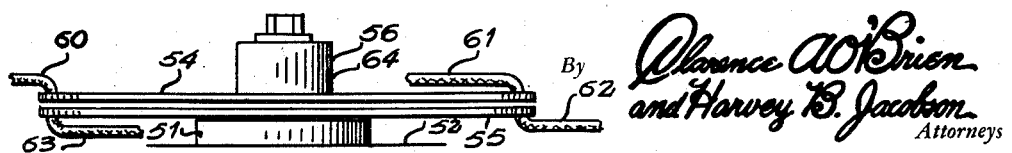

Patented Sept. 12, 1950

2,522,159

UNITED STATES PATENT OFFICE 2,522,159

CONTROL FOR COMBINED AILERONS AND FLAPS

Charles R. Billington, Memphis, Tenn.

Application October 14, 1946, Serial No. 703,162

4 Claims. (Cl. 244—83)

This invention relates to new and useful improvements and structural refinements in airplane controls, more specifically, controls for ailerons and wing flaps.

In conventional practice, it is customary to provide an aileron on each wing adjacent the wing tip, and a wing flap on each wing adjacent the fuselage. The ailerons are coordinated for movement in relatively opposite directions, while the wing flaps are raised or lowered simultaneously.

It is the principal object of the invention to combine the pair of ailerons and the pair of wing flaps into one pair of movable surfaces and to provide means whereby the latter may be effectively controlled so as to function as both the ailerons and flaps. In other words, the primary purpose of the invention is to provide a control whereby the pair of movable surfaces may be moved simultaneously in one direction to function as flaps, and in addition, whereby the same may be moved in relatively opposite directions, to function as ailerons.

A further object of the invention is to provide a control which is simple in construction, dependable in operation, and which may be readily installed in position on the aircraft.

Another object of the invention is to provide a control wherein the operation of the movable surfaces as ailerons is independent with respect to their operation as wing flaps, and in the event that the components of the control governing the wing flap function have become damaged or otherwise inoperative, the function of the control governing ailerons will not be affected.

An additional object of the invention is to provide a control which will not easily become damaged and which will readily lend itself to economical manufacture.

A still further object of the invention is to eliminate the conventional wing flaps by combining the function thereof with that of the ailerons, as has been already explained.

With the above more important objects in view, and such other objects as may become apparent as this specification proceeds, the invention consists essentially of the arrangement and construction of parts as illustrated in the accompanying drawings, in which:

Figure 1 is a perspective view of the invention.

Figure 2 is a cross-sectional view, taken substantially in the plane of the line 2—2 in Figure 1.

Figure 3 is a top plan view of a modified embodiment of the invention.

Figure 4 is a side elevation of the device shown in Figure 3, and

Figure 5 is an end view, taken in the direction of the arrow 5 in Figure 3.

Like characters of reference are used to designate like parts in the specification and throughout the several views.

Referring now to the accompanying drawings in detail, more particularly to Figures 1 and 2, the invention consists of a control designated generally by the reference character 10. The same embodies in its construction a stationary mounting plate 11, such as may be suitably secured to the floor, or the like, 12 of the aircraft fuselage.

The plate 11 is provided with an upright pivot 13, screw-threaded at the free end thereof as at 14, and an arm 15 is rotatably mounted medially of its length on this pivot, as will be clearly apparent from the accompanying drawings.

The arm 15 is configurated substantially as shown, being provided adjacent its ends with a pair of apertures 16 in which a pair of control cables 17 may be suitably anchored. The cables 17 pass around convenient guide pulleys 18 and the remaining ends thereof are connected to the conventional aileron actuating mechanism of the aircraft, such as for example, the joy-stick.

A portion of the arm 15 is of relatively greater thickness and provides a hydraulic cylinder 19 which will be hereinafter more fully described. A relatively thick portion 20 provided on the arm 15 adjacent the cylinder 19 merely constitutes a bearing boss which facilitates convenient mounting of the arm as a whole upon the pivot 13.

A pair of crossed levers 21, 22 are rotatably mounted at the intersection thereof on the pivot 13, between the arm 15 and the mounting plate 11. These levers are provided adjacent their ends with suitable apertures 23 and pairs of control cables 24, 25 are anchored in these apertures. The free ends of these cables are, in turn, connected to the actuating cranks 26 of the movable surfaces or sections 27, 28 provided on the wings 29. As will be hereinafter more fully explained, the sections 27, 28 function as both the ailerons and wing flaps, so that for purposes of identification, each of the sections 27 and 28 will be hereinafter designated as a combined aileron and flap.

It will be noted that the sections 27, 28 are hingedly attached to the wings 29 in any suitable manner, as indicated in the accompanying drawings by the hinge pins 30. It should be also observed that the pair of cables 24 connect the lever 21 to the section 27, while the cables 25 connect the lever 22 to the section 28.

The aforementioned hydraulic cylinder 19 is double acting and is equipped adjacent the relatively opposite ends thereof with the fluid connections 31, so that hydraulic pressure may be exerted upon either side of a piston 32 with which the piston is provided. The piston 32 is secured to a slidable piston rod or plunger 33 which protrudes outwardly from the cylinder 19 and carries at its free extremity an attachment bracket 34.

A pair of equalizing links 35 are pivoted to the bracket 34 by means of a suitable bolt or screw 36, the latter extending through one end portion of each link, as will be clearly apparent from the accompanying drawings. The remaining ends of the links 35 are pivotally connected to the adjacent ends of the levers 21, 22, that is, each link is connected to one of the levers.

The connection of the links to the levers is accomplished in any suitable manner and it should be added that a nut 36 and a washer 37 are provided on the screw-threaded portion 14 of the pivot 13, whereby the arm 15 and the levers 21, 22 are effectively retained upon the pivot.

When the invention is placed in use, it should be first assumed that the piston 32 remains stationary in the cylinder 19 and that the joy-stick (not shown) is manipulated so as to move the cables 17 in the direction of the arrows 38. In such instance, the arm 15, the levers 21, 22 and the links 35 will, as a whole, rotate upon the pivot 13 in the direction of the arrow 39 and the cables 24, 25 will be pulled in the direction of the arrows 40. Accordingly, the wing section 27 will be lowered as indicated at 41, while the wing section 28 will be raised as shown at 42.

It will thus be observed that the actuation of the joy-stick as described will move the sections 27, 28 in relatively opposite directions and the same will function in the conventional manner as ailerons.

It should be understood that the sections 27, 28 and the wings 29 are illustrated diagrammatically and that, in actual practice, the longitudinal axes of the sections 27, 28 will be aligned.

The actuation of the hydraulic cylinder 19 by admitting fluid to either side of the piston 32 will, of course, slide the plunger 33 in a corresponding direction. Assuming that the cylinder is actuated so as to slide the plunger in the direction of the arrow 43, the equalizing links 35 will move the levers 21 and 22 in the direction of the arrows 44 and 45 respectively.

This action, in turn, will be transmitted through the medium of the cables 24, 25 to the respective sections 27, 28, both the latter being moved in the direction of the arrows 46. It will be observed that in this manner, the actuation of the cylinder 19 will move the sections 27, 28 simultaneously in the same direction and the sections will thus perform the function of conventional wing flaps.

The sections 27, 28 will thus perform the function of both the conventional ailerons and wing flaps, depending upon whether they are actuated by the joy-stick or by the hydraulic cylinder 19. It should be particularly noted that the two forms of actuation are relatively independent and that, if desired, they may occur simultaneously.

In the event that the sections are not required to function as flaps or if, for any reason, the cylinder 19 has become inoperative, the relative position of the levers 21, 22 with respect to one another and with respect to the arm 15 may be locked in a predetermined position. This is accomplished by the provision of a locking pin 47 which may be inserted into suitable apertures provided in the arm 15 and in the plunger 33, thereby preventing relative movement of the plunger with respect to the arm.

Referring now to the accompanying Figures 3, 4 and 5, the same illustrate a modified embodiment of the invention, namely, a control designated by the general reference character 50 which is of a relatively simpler construction and is particularly adapted for use in association with small aircraft.

The control 50 embodies in its construction a mounting plate 51 adapted for securing to the aircraft fuselage 52, the plate 51 being provided with an upstanding pivot 53 on which are rotatably mounted a pair of crossed levers 54, 55 and an arm 56.

The latter corresponds to the aforementioned arm 15, but it will be noted that the pivot 53 extends adjacent one end of the arm 56, rather than medially of its length as in the previous instance. The arm 56 is configurated substantially as shown and the free end thereof provides anchorage as at 57 for a pair of opposing cables 58. These cables pass around suitable guide pulleys 59 and are connected to the aileron actuating mechanism of the aircraft, such as the conventional joy-stick.

The lever 54 is connected through the medium of the cables 60, 61 to one combined aileron and flap, while the lever 55 is similarly connected by the cables 62, 63 to the other combined aileron and flap. These are not shown in the accompanying drawings but are similar to the aforementioned sections 27, 28 in Figure 1.

The boss 64 of the arm 56 provides a bearing 65 for a shoulder 66 of a rotatable screw 67, the latter being actuated through the medium of a connecting shaft 68 by a suitable crank (not shown) provided in the aircraft cockpit.

The screw 67 carries a nut-like traveler 69 equipped with laterally projecting wings 70, and a pair of equalizing links 71 are pivotally connected to these wings, as at 72. The remaining ends of the links 71 are, in turn, pivotally attached to the adjacent ends of the levers 54, 55, as will be clearly apparent from the accompanying drawings.

When this embodiment of the invention is placed in use, actuation of the joy-stick will move the cables 58 for example, in the direction of the arrows 73 and the control, as a whole, will rotate upon the pivot 53 in the direction of the arrows 74. This movement will be transmitted through the medium of the cables 60, 61, 62 and 63 to the combined ailerons and flaps, so that the same will be moved in relatively opposite directions, as indicated at 75. In this manner, the conventional aileron action will be accomplished.

Rotation of the shaft 68 will, in turn, move the traveler 69, for example, in the direction of the arrow 76, and as a result, the levers 54, 55 will be moved in the direction of the arrows 77, 78 respectively. Accordingly, it will be seen that the combined ailerons and flaps will be moved simultaneously in the same direction, as indicated at 79. The action of the conventional wing flaps will thus be facilitated.

It will be also noted that since the screw 67 and the traveler 69 are self-locking, the provision of the aforementioned locking pin 47 in this embodiment is unnecessary.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a control for ailerons, a stationary pivot, an arm having a bore rotatably mounted on said pivot, a pair of levers crossed intermediate their ends and rotatably mounted at the intersection thereof on said pivot, each of said levers being operatively connected to an aileron, a longitudinally slidable plunger provided in said bore, a pair of equalizing links each pivoted at one end thereof to said plunger, the opposite end of each link being pivoted to the adjacent end of one of said levers, and means secured to said arm for conducting fluid to said bore for sliding said plunger.

2. The combination of claim 1, and a locking pin carried by said arm and removably connected with said plunger to hold said plunger in a predetermined position.

3. A control apparatus for ailerons which have operating mechanisms secured thereto comprising a fixed pivot pin, a pair of levers crossed intermediate their ends and having said pivot pin passed through the intersection thereof, each of said levers having means at the ends thereof connecting them individually with the operating mechanism for the ailerons, a pair of equalizing pitman links pivotally connected together at one pair of ends, the opposite ends being secured to said levers, an arm pivoted intermediate its ends on said pivot pin, a first control cable secured to one end of said arm and a second control cable secured to the opposite end of said arm, a plunger, a cylinder in said arm having said plunger reciprocatively disposed therein, the plunger including a piston which is disposed in said cylinder and including a piston rod, said piston rod being connected with said pair of links at the junction thereof so that when said plunger is urged within said cylinder in a direction away from said pivot pin, said links are pulled toward each other thereby operating said levers.

4. The combination of claim 3, and a locking pin carried by said arm and removably connected with said piston rod to hold said piston rod in a predetermined position.

CHARLES R. BILLINGTON.

REFERENCES CITED

The following references are of record in the file of this patent:

UNITED STATES PATENTS

| Number | Name | Date |
| --- | --- | --- |
| 1,600,079 | Thomas | Sept. 14, 1926 |
| 1,716,121 | Giffen | June 4, 1929 |

FOREIGN PATENTS

| Number | Country | Date |
| --- | --- | --- |
| 420,928 | Great Britain | Dec. 11, 1934 |
| 669,065 | Germany | Dec. 16, 1938 |